United States Patent [19]
Scherpenborg

[11] 3,811,413
[45] May 21, 1974

[54] HORSE FLY COLLAR

[76] Inventor: Arnold H. Scherpenborg, 4721 Orange Knoll, La Canada, Calif. 91011

[22] Filed: Oct. 10, 1972

[21] Appl. No.: 296,263

[52] U.S. Cl.................. 119/106, 119/156, 424/219
[51] Int. Cl............................................. A01k 27/00
[58] Field of Search............ 119/106, 156; 424/219, 424/17; 127/30

[56] References Cited
UNITED STATES PATENTS

| | | | |
|---|---|---|---|
| 2,401,253 | 5/1946 | Lamb, Jr............................ | 119/106 |
| 3,470,293 | 9/1969 | Geiger............................ | 424/219 X |
| 2,030,461 | 2/1936 | Moss.................................. | 127/30 |
| 3,160,556 | 12/1964 | Beaver et al..................... | 424/219 X |

FOREIGN PATENTS OR APPLICATIONS

| | | | |
|---|---|---|---|
| 918,825 | 2/1963 | Great Britain..................... | 424/219 |
| 1,044,663 | 10/1966 | Great Britain..................... | 424/219 |
| 1,081,075 | 8/1967 | Great Britain..................... | 424/219 |

*Primary Examiner*—Robert Peshock
*Assistant Examiner*—J. N. Eskovitz
*Attorney, Agent, or Firm*—John E. Wagner

[57] ABSTRACT

A band or strap for encircling the neck of a horse or pony carrying an elongated pocket having the upper surface perforated. Contained within the pocket is a mixture constituting a low volatility insecticide material on a granular carrier having an attractive characteristic for flies. A disagreeable taste material is also deposited on the granular material which is merely unpleasant to the taste of horses or humans who might come in contact with the collar and also controls the vaporization of this active ingredient. Also is disclosed a process for producing the insecticide combination and a novel insecticide combination.

6 Claims, 5 Drawing Figures

PATENTED MAY 21 1974 3,811,413
FIG. 1
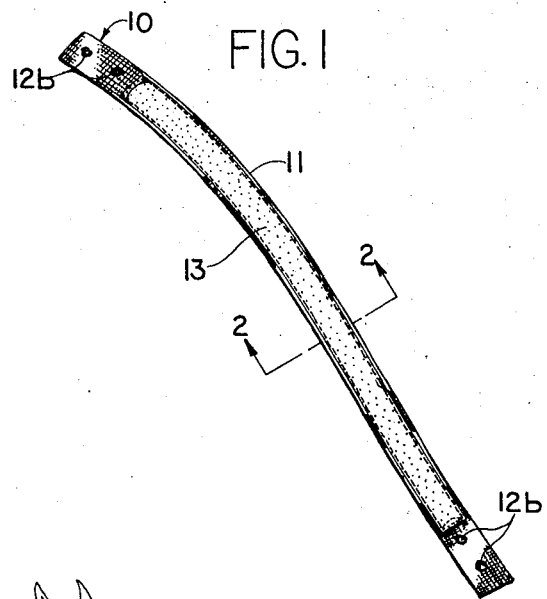
FIG. 2
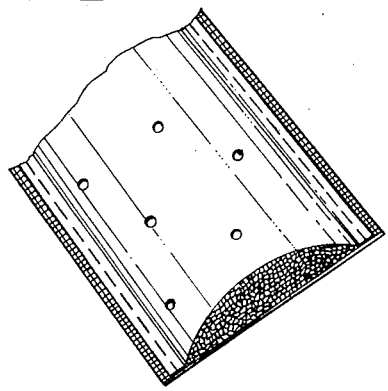
FIG. 3
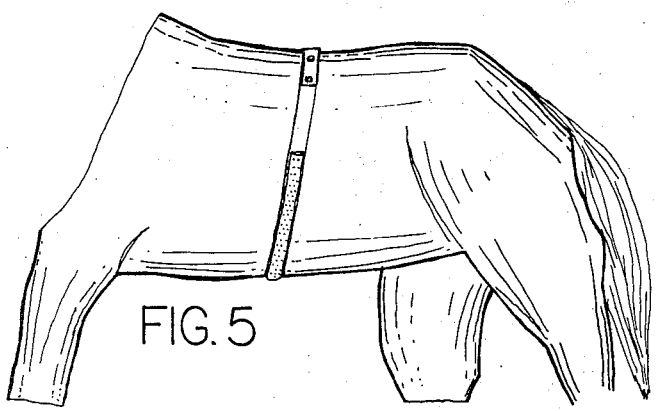
FIG. 4
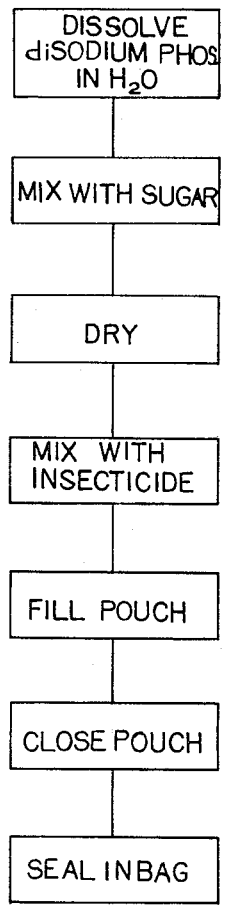
- DISSOLVE diSODIUM PHOS IN H₂O
- MIX WITH SUGAR
- DRY
- MIX WITH INSECTICIDE
- FILL POUCH
- CLOSE POUCH
- SEAL IN BAG
FIG. 5

HORSE FLY COLLAR

BACKGROUND OF THE INVENTION

From the history of domestic animals, the common fly has been the scourge of horses. Not only is the fly disturbing to the comfort of the horses but is a carrier of larvae which cause infections in the skin, ears and eyes of horses. Numerous mechanical devices for assisting the horse in removal of flies have been invented. Chemical insecticides, whenever attempted to be applied to horses, either are ineffective of deleterious to the well being of the horse itself.

BRIEF STATEMENT OF THE INVENTION

I have therefore invented a horse collar carrying an insecticide which serves to attract and disable or kill flies and thereby eliminate them from the entire head and neck region of the horse. The collar, at the same time, in no way interferes with normal grazing, exercise, work or riding of the horse and is not attractive or harmful to the horse. The collar is light weight and hardly noticeable by the horse when in place. It contains a relatively large surface area of insecticide material carried in an elongated pouch with perforations of sufficient size to allow the controlled vaporization of the active ingredient for a period of months and therefore provide long term effective protection for the horse wherever he goes. The insecticide is carried deposited on the surface of granular sugar in the presence of a deliquescent disagreeable tasting material. The preferred active insecticide present is 2.2 — Dichlorovinyl Dimenthyl Phosphate.

DETAILED DESCRIPTION OF THE DRAWINGS

This invention may be more clearly understood from the following detailed description and by reference to the drawing in which:

FIG. 1 is a perspective view of a horse collar in accordance with this invention;

FIG. 2 is an enlarged fragmentary section taken along lines 2—2 of FIG. 1;

FIG. 3 is a side view of the head region of a horse wearing a collar of this invention; and FIG. 4 is a process flow diagram for the method of manufacture of the insecticide in accordance with this invention.

FIG. 5 is a fragmentary side view of a horse wearing a collar of this invention about his withers.

DETAILED DESCRIPTION OF THE INVENTION

Now referring to FIG. 1. A horse collar 10 generally designated 10 may be seen as including a woven web 11 of approximately 40 inches in length and 2 inches in width and having a pair of snap fasteners 12a and 12b at the end regions thereof to snap the collar around the neck of the horse to be protected. The web is preferably of a non-absorbent material such as nylon and I have found that conventional automobile seat belt material is eminently satisfactory for this purpose. It has a high tensile strength and resistant to abrasion. The easy release characteristics of the snap fasteners allows the belt to be released in the event the horse becomes entangled.

Carried in the intermediate section of the belt is a pouch 13 of relative impervious material such as cotton backed vinyl plastic having a number of perforations or openings therethrough in the order of 1/32 inch diameter. The dimensions of the perforated material are approximately 1½ inches × 30 inches and have openings or perforations in the order of 10 per square inch. The pouch formed by the back and perforated material is filled with approximately 10 oz. of the material described below resulting in an upward bulging of the pouch of approximately one-fourth inch at the highest point of the pouch. This pouch and its relationship with the web and filling material is readily apparent in FIG. 2.

The filling material is described in more detail below but is basically granular and exudes vapor through the perforations upward into the air surrounding the animal wearing the collar. This illustrated in FIG. 3 showing a horse having a fly collar about its neck. The dashed circle indicates the protected zone. It is apparent from the description about that a substantial volume of insecticide material is present. It is in excess of 99 percent inert material but this inert material provides a carrier for the insecticide and additionally is an attractant for flies. I have found that the most successful carrier material is unrefined sugar which has adsorbed the active ingredient on its surface.

The sugar constituting a material which dissolves readily and provides a slight exudate through the orifices provide an attraction for flies. Included also in the insecticide mixture is hygroscopic material which has been deposited on the sugar granules by drying in accordance with the process described below and providing disagreeable taste should the collar be licked by another animal or if it comes in contact with humans. A small amount of hygroscopic material controls the vaporization rate of the active ingredient and thus controls the useful life of the collar.

The preferred mixture is as follows:

|  |  | Useful Range |
|---|---|---|
| Active Ingredient | | |
| 2,2-Dichlorovinyl Dimethyl Phosphate | 0.93% | 0.7–1.3 |
| Hygroscopic Material | | |
| di Sodium Phosphate | 0.07% | 0.02–0.07 |
| Carrier | | |
| Sugar, unrefined | 99.0% | 98.5–99.0 |
| Total | 100.00% | |

Other active insecticides may be used but the foregoing is preferred and in combination with the sugar carrier and di sodium phosphate constitutes an effective animal fly protection.

PROCESS OF MANUFACTURE

The insecticide combination, employed in accordance with this invention is manufactured by the following process.

First di sodium phosphate, chemical grade, is dissolved in sufficient water to produce a slurry or jelly-like mixture. The slurry is then introduced into unrefined sugar. The desired consentration is obtained by a solution of one ounce of di sodium phosphate mixed with 100 lbs. of sugar. The mixture is then dried on a moving belt at 95° to 100° F. for approximately two hours. Thereafter the active ingredient in the form of a gray powder is mechanically mixed into the sugar phosphate combination until the active ingredient is thoroughly mixed. This is strictly a dry mixing process and no particular requirements for the mixing step are present.

Therafter, a measured amount, for example, 10 oz. plus or minus one-half oz. is introduced into a funnel type filler with approximately a 20 inches discharge tube with a stop at the base of the funnel. The tube is inserted in an open end of the pouch and withdrawn slowly after removing the funnel stop and allowing the tube to be filled. Upon withdrawal of the tube, the pouch is filled and may thereafter be closed by sewing across the open end. The collar is then sealed in a plastic bag or other relatively air tight container which prevents loss of the active ingredient before use.

USE

The use of the collar in accordance with this invention is quite simple. It is stored and sold in the sealed plastic bag or container which prevents vaporization of the active ingredient. When the plastic container is opened, the collar is removed and simply snaped aroung the horses neck. It is designed to be worn loosely such that two or three fingers may be inserted between the collar and the horses neck. As soon as it is in place, the collar attracts flies and kills them and will continue to kill them for approximately 2 months. Because of the soluble nature of the carrier, the collar is removed while bathing a horse or in rain.

Larger versions of the same collar type device may be made of sufficient length to encircle the withers of the horse. Such an arrangement is shown in FIG. 5. Such a belt serves to keep flies from the horses underside which is particularly susceptible to flies and their larvae.

The above-described embodiments of this invention are merely descriptive of its principles and are not to be considered limiting. The scope of this invention instead shall be determined from the scope of the following claims, including their equivalents.

What is claimed is:

1. A fly protection horse collar comprising a discontinuous band of material of sufficient length to encircle the neck of a horse including means for securing the ends of said band together around said horse;
   said band being of relatively vapor impervious material;
   an elongated pouch secured to the outer face of said band in position to substantially encircle the neck of the horse and exposed outward to the air surrounding the neck of the horse;
   said pouch comprising a flexible cover of relatively vapor impervious body having a plurality of openings therethrough for emission of vapor;
   said pouch filled with material comprising a mixture of an insecticide material having sufficient high vapor pressure to evaporate through the openings of said pouch into the region surrounding the horse;
   said insecticide deposited on the surface of a granular carrier material exhibiting attraction to flies;
   a hygroscopic material mixed with said granular material for attracting water vapor into said pouch to control the vaporization rate of said insecticide;
   said insecticide material comprising 2,2-Dichlorovinyl Dimethyl phosphate and
   said hygroscopic material comprises Disodium phosphate, and wherein
   said insecticide material and said hygroscopic material constitutes between 0.7 and 2.0 percent of said material filling said pouch.

2. The combination in accordance with claim 1 wherein said insecticide ranges between 0.07 and 1.3 percent of the material filling said pouch.

3. The combination in accordance with claim 1 wherein said hygroscopic material ranges between 0.02 and 0.7 percent of the material filling said pouch.

4. The combination in accordance with claim 1 wherein said granular carrier comprising unrefined sugar.

5. The combination in accordance with claim 1 wherein the ingredients of said pouch comprise a mixture of

| 2,2-Dichlorovinyl Dimethyl Phosphate | 0.7 – 1.3 |
|---|---|
| Di Sodium Phosphate | 0.02 – 0.7 |
| Unrefined Sugar | 98.5 – 99.0 | in the foregoing range of percentages.

6. A fly protection device for horses comprising a discontinuous band of material of sufficient length to encircle the withers of a horse including means for securing the ends around said horse;
   said band being of relatively vapor impervious material;
   an elongated pouch secured to the outer face of said band in position to be exposed outward to the air surrounding the withers of a horse;
   said pouch comprising a flexible cover of relatively vapor impervious body having a plurality of openings therethrough for the emission of vapor;
   said pouch filled with material comprising a mixture of an insecticide material having sufficient high vapor pressure to evaporate through the openings of said pouch into the region surrounding the horse;
   said insecticide deposited on the surface of a granular carrier material exhibiting attraction to flies;
   a hygroscopic material mixed with said granular material for attracting water vapor into said pouch to control the vaporization rate of said insecticide;
   said insecticide material comprising 2,2-Dichlorovinyl Dimethyl phosphate and
   said hygroscopic material comprises Disodium phosphate, and wherein
   said insecticide material and said hygroscopic material constitutes between 0.7 and 2.0 percent of said material filling said pouch.

* * * * *